(12) United States Patent
Jaroniec et al.

(10) Patent No.: US 7,666,380 B2
(45) Date of Patent: Feb. 23, 2010

(54) IMPRINTED MESOPOROUS CARBONS AND A METHOD OF MANUFACTURE THEREOF

(75) Inventors: Mietek Jaroniec, Stow, OH (US);
Zuojiang Li, Kent, OH (US)

(73) Assignee: Kent State University, Kent, OH (US)

( * ) Notice: Subject to any disclaimer, the term of this patent is extended or adjusted under 35 U.S.C. 154(b) by 602 days.

(21) Appl. No.: 11/325,134

(22) Filed: Jan. 4, 2006

(65) Prior Publication Data
US 2006/0133981 A1 Jun. 22, 2006

Related U.S. Application Data

(62) Division of application No. 10/193,875, filed on Jul. 12, 2002, now abandoned.

(51) Int. Cl.
*C01B 31/02* (2006.01)
(52) U.S. Cl. ..................... 423/445 R; 264/43
(58) Field of Classification Search ............. 423/445 R; 264/43
See application file for complete search history.

(56) References Cited

U.S. PATENT DOCUMENTS

| 3,607,601 | A | | 9/1971 | Milam et al. |
| 5,556,570 | A | | 9/1996 | Ueda |
| 6,024,899 | A | * | 2/2000 | Peng et al. .................. 264/29.1 |
| 6,064,560 | A | | 5/2000 | Hirahara et al. |
| 6,248,691 | B1 | | 6/2001 | Gadkaree et al. |
| 6,515,845 | B1 | * | 2/2003 | Oh et al. ..................... 361/502 |

* cited by examiner

*Primary Examiner*—Stuart Hendrickson
(74) *Attorney, Agent, or Firm*—Hudak, Shunk & Farine Co. LPA

(57) ABSTRACT

A porous carbon composition comprises carbon particles having substantially uniform mesopores, wherein the mesopores have a diameter greater than 5 nanometers. A carbon composition may also comprise carbon particles having a predetermined surface configuration, wherein the surface configuration inversely corresponds to the configuration of at least a portion of an imprinting material. A method of synthesizing mesoporous carbon particles comprises the steps of providing particles of at least one carbon precursor, mixing the particles of at least one carbon precursor with a medium containing an imprinting material to form pretreated solid carbon precursor particles, heating the pretreated solid carbon precursor particles to a temperature at least as high as 20° C. below the softening point of the solid carbon precursor, optionally, stabilizing the solid carbon precursor in air, carbonizing the carbon precursor to form carbon hybrid particles, and removing the imprinting material from the carbon hybrid particles.

7 Claims, 11 Drawing Sheets

Nitrogen adsorption isotherms at −196°C for colloid-imprinted carbons.

Pore size distributions for colloid-imprinted carbons.

TEM image of Sample CIC-24A

Nitrogen Adsorption Isotherms for ungraphitized carbon (CIC-24C), graphitized carbon (CIC-24C-G) and a commercial carbon (Carbopack X)

Pore Size Distributions for ungraphitized carbon (CIC-24C), graphitized carbon (CIC-24C-G) and commercial carbon, CARBOPACK X (CarboX)

IMPRINTED MESOPOROUS CARBONS AND A METHOD OF MANUFACTURE THEREOF

CROSS-REFERENCE

This is a division of application Ser. No. 10/193,875, filed on Jul. 12, 2002, now abandoned of Mietek Jaroniec, et al, for IMPRINTED MESOPOROUS CARBONS AND A METHOD OF MANUFACTURE THEREOF.

BACKGROUND OF THE INVENTION

This invention relates to the synthesis of structured carbons. More particularly, this invention relates to a method of synthesis of mesoporous and other carbons by imprinting precarbon particles which are then carbonized.

There is great interest in the synthesis of mesoporous carbons because of their applications in adsorption and separation of large organic compounds, double layer capacitors and rechargeable batteries. Mesoporous carbons are generally considered to be carbons with pores having diameters between about 2 nanometers (nm) and about 50 nm. Although porous carbons have been in use for thousands of years and have become industrially important in various areas, methods to design their porous structures are relatively recent. One such method employs ordered mesoporous silicas (OMS), e.g., MCM-48 and SBA-15, as templates. According to these methods, the pores of a silica are filled with a carbon precursor such as sucrose, poly(furfuryl alcohol), or phenolic resin, followed by carbonization of the carbon precursor and dissolution of the silica. The resulting carbons exhibited ordered mesopores of a size below about 7 nm, arising from the dissolution of the silica framework. However, carbons synthesized from OMS of different pore sizes exhibit similar pore width because the pore size in these carbons is determined by the wall thickness of the silica templates, which is usually about 1-3 nanometers (nm).

Other methods, which are more appropriate for the preparation of macroporous materials, involve the use of silica colloids as templates. Colloidal silica particles and colloidal crystals have both been used for the preparation of porous carbons. Colloidal silica particles may be used to synthesize mesoporous carbons by mixing colloidal silica particles with a fluid-type carbon precursor to obtain a composite aggregate, subsequent carbonization of the composite, and silica dissolution. This method provides a carbon with disordered pores resembling the initial colloidal aggregates.

In contrast, the colloidal crystal templating method provides carbons with ordered macropores (pores greater than about 50 nm) or mesopores of size greater than 30 nm. This templating route involves the formation of colloidal crystals, infiltration of the crystal's interstitial space with a fluid-type carbon precursor and its solidification followed by removal of the template. A common feature of the aforementioned templated carbons is the presence of disordered micropores (pores with diameters less than 2 nm) in the walls of ordered macropores or mesopores. These micropores are formed during carbonization of many common carbon precursors.

Therefore, a need exists for a method of synthesizing mesoporous carbons having uniform mesopores with negligible microporosity. A need also exists for a method of synthesizing mesoporous carbon that permits the pore size to be adjusted over a wide range of mesopores, i.e., from about 5 nm to 30 nm or more, and which allows the pore volume and surface area to be tailored.

BRIEF SUMMARY OF THE INVENTION

It is, therefore, an aspect of the present invention to provide carbons with a desired size of mesopores, tailored pore volume and tailored surface area, and a method for manufacturing such carbons.

In general, the present invention provides a porous carbon composition comprising carbon particles having substantially uniform mesopores, wherein the mesopores have a diameter greater than 5 nanometers.

The present invention also provides a carbon composition comprising carbon particles having a predetermined surface configuration, wherein the surface configuration inversely corresponds to the configuration of at least a portion of an imprinting material.

The present invention also provides a method of synthesizing mesoporous carbon particles comprising the steps of providing particles of at least one carbon precursor, mixing the particles of at least one carbon precursor with a medium containing an imprinting material to form pretreated solid carbon precursor particles, heating the pretreated solid carbon precursor particles to a temperature at least as high as 20° C. below the softening point of the solid carbon precursor, optionally, stabilizing the solid carbon precursor in air, carbonizing the carbon precursor to form carbon hybrid particles, and removing the imprinting material from the carbon hybrid particles to form mesoporous carbon particles.

DETAILED DESCRIPTION OF THE INVENTION

Figure 1:
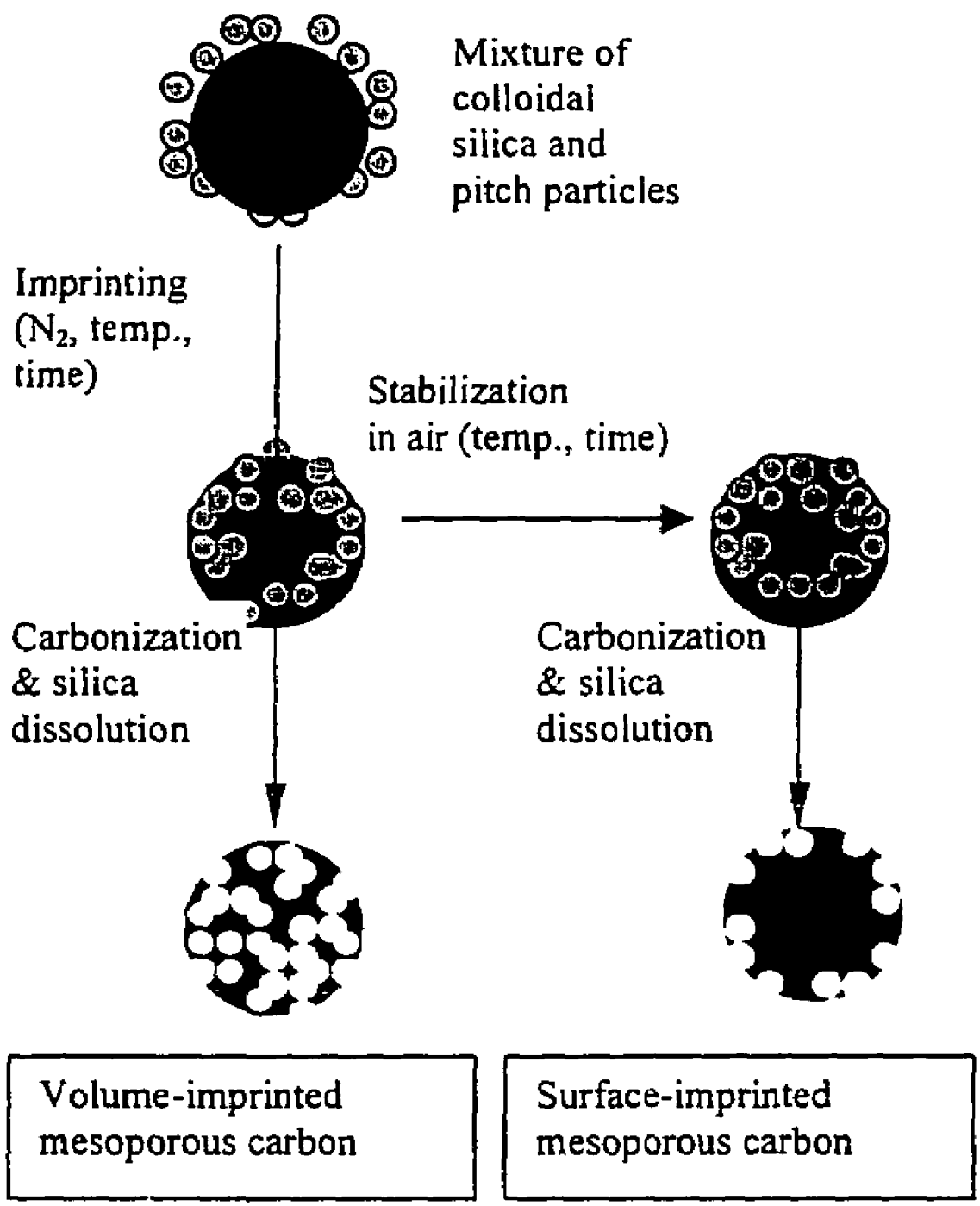
FIG. 1 is a schematic representation of the method of synthesis of volume imprinted and surface imprinted mesoporous carbons with uniform spherical mesopores.

This invention provides a novel approach to the synthesis of carbonaceous materials, which involves creation of mesopores in carbon precursor particles by imprinting with an imprinting material such as colloidal silica particles. In contrast to the colloidal template process, which involves the use of a fluid-type carbon precursor, the colloid-imprinted carbons (CIC) are synthesized by imprinting solid particles of mesophase pitch or other carbon precursor, with an imprinting material.

As mentioned above, the present invention provides a method of synthesizing mesoporous carbon particles comprising the steps of providing particles of at least one carbon precursor, mixing the particles of at least one carbon precursor with a medium containing an imprinting material to form pretreated solid carbon precursor particles, heating the pretreated solid carbon precursor particles to a temperature at least as high as 20° C. below the softening point of the solid carbon precursor, optionally stabilizing the solid carbon precursor in air, carbonizing the carbon precursor to form carbon hybrid particles, and removing the imprinting material from the carbon hybrid particles.

Acceptable carbon precursor materials include various types of pitch such as carbon-containing synthetic pitch, mesophase pitch, isotropic petroleum pitch, coal tar based pitch and pitch modified with polymeric additives. It is also envisioned that other organic materials that soften between about 200° C. and about 400° C. may also be used. Suitable polymeric compositions include polystyrene, polyacrylonitrile, phenolic resins, and the like. The polymeric compositions may be functionalized or mixed with fillers to make them extrudable. A preferred solid carbon precursor is mesophase pitch.

An advantage of using mesophase pitch is its easy carbonization, which leads to almost non-microporous carbons. Pitch is a common precursor for carbon fibers, which are nonporous materials. The carbon precursor may take any desired shape including particles, fibers, and flakes for example, depending on the particular demands of a specific application. When the carbon precursor is in the form of particles, the diameter of the particles may be of any size. The shape of the carbon precursor is not significantly changed by the method of the present invention. Therefore, mesoporous carbons of the present invention may also take any desired shape, including fibers, flakes and spherical or nearly spherical particles. The size of the precarbon material, and therefore, the carbon material, will also vary with the desired application to which the carbon material will be used. In one example, the precarbon material measures less than about 100 μm in at least one dimension. In another example, the precarbon material measures less than about 50 μm in at least one dimension.

The imprinting material may be any material that can be removed from a carbon-hybrid particle without degrading the carbon structure. A preferred imprinting material is silica. The imprinting material may be of any size, depending on the size of the carbon precursor particles and the desired properties of the final carbon particles. When it is desired that pores be formed in a carbon particle, the imprinting material may be in the form of a colloidal suspension of particles measuring from about 5 nanometers to about 1 micrometer in at least one dimension. The precarbon particles can be also imprinted with porous imprinting media of sizes exceeding the size of colloids. When it is desired that the pore wall structure of an imprinting material be imprinted onto the surface of a carbon particle, the imprinting material may be comprised of nonporous and porous particles measuring from about 1 micrometer to about 50 micrometers in at least one dimension.

A particular imprinting material is colloidal silica of uniform spherical particles measuring between about 0.5 and about 100 nm in at least one dimension. In another example, the imprinting material is colloidal silica particles measuring between about 7 and about 100 nm in at least one dimension. In still another example, the imprinting material is colloidal silica particles measuring between about 10 and about 100 nm in at least one dimension. In another embodiment, the imprinting material is porous silica particles measuring between about 1 and about 30 micrometers in at least one dimension. Additionally, colloidal silica particles of more than one size may be used, resulting in carbon particles having a multi-modal distribution of pores that correspond in size to the sizes of the silica particles. The method of the present invention provides carbon particles with a narrow distribution of pore sizes. Preferably, a majority of the pore sizes are within 20 percent of the most predominant pore size. More preferably, a majority of the pore sizes are within 10 percent of the most predominant pore size.

Colloidal particles of different sizes and/or chemical nature may be used in the method of the present invention to allow the design of pores of different sizes in the CIC materials as well as to tailor their sorption and catalytic properties. For example, mixtures of colloidal silica and colloidal metals or metal oxides, such as gold, platinum, titanium oxide, zirconium oxide, may be used to create carbons having a desired catalytic activity. This catalytic activity is provided by the metal or metal oxide, which at least partially survives removal of the imprinting material.

A solution for mixing the carbon precursor and the imprinting material may be an aqueous or organic solution or mixture thereof. Preferably, the solution for mixing the carbon precursor and the colloidal silica is a water-organic solvent solution, such as a water-ethanol solution.

The step of heating the pretreated solid carbon precursor particles to at least as high as 20° C. below the softening point of the carbon precursor will preferably take place in a nonoxidizing atmosphere such as a nitrogen or argon atmosphere. Preferably the temperature of this step will be at least as high as 10° C. below the softening point of the carbon precursor. In those embodiments where a volume imprinted mesoporous carbon is desired, the temperature may equal or exceed the softening temperature of the carbon precursor. When a temperature higher than the softening temperature is used, it may exceed the softening temperature by as much as about 200° C. The step of carbonizing the carbon precursor to form silica-carbon hybrid particles also includes heating the pretreated solid carbon precursor particles in an inert atmosphere, preferably a nitrogen or argon atmosphere.

The step of removing the imprinting material from the carbon hybrid particles may be accomplished by any known method. For example, when silica is used as an imprinting material, suitable methods of removal include treating the silica-carbon hybrid particles with a basic solution at a temperature above room temperature. One such method uses 3 M NaOH at 95° C. Alternatively, the silica may be removed by treatment with an acid such as HF.

A schematic representation two particular embodiments of the method of the present invention is presented in FIG. 1. As can be seen, colloidal imprinting (CI), depending on the synthesis conditions, allows the creation of well defined pores in the volume of precursor particles as well as on their surface. In this embodiment, a mixture of colloidal silica and pitch particles are heated in an inert atmosphere. By controlling the time and temperature of this step, the properties of the pores can be controlled. For example, by limiting the time and/or temperature of this step, or stabilizing the carbon precursor by exposure to air, the penetration of the colloid particles into the carbon precursor is limited, and only the surface of the carbon precursor is imprinted with silica particles. In one example, the stabilizing step includes treatment at about 220° C. in air. After carbonization and subsequent removal of the silica particles, a surface-imprinted mesoporous carbon is obtained.

If, however, a higher temperature and/or longer time is used for the treatment of the mixture of colloidal silica and pitch particles, and a stabilization step is not utilized, the colloid particles can penetrate deeper into the carbon precursor, including throughout the volume of the carbon precursor particles. This results in a volume-imprinted mesoporous carbon.

In order to demonstrate the practice of the present invention, mesoporous carbon particles were synthesized as described below. The synthesis of CIC was accomplished using a synthetic Mitsubishi mesophase pitch (softening point=237° C.). The powdered mesophase pitch (particles <45 μm) was dispersed in ethanol, mixed with an excess of colloidal silica solution in a closed flask and stirred at about 50° C. for five hours. Next, the flask was opened, allowing a slow evaporation of solvent under stirring. When the solvent was evaporated, the temperature was increased to about 260° C., which is slightly higher than the softening point of this pitch, and held for one hour under nitrogen atmosphere. During this process, colloidal particles diffused into the pitch particles and formed a colloidal silica-pitch composite. The colloidal silica-pitch composite was carbonized at 900° C. under a nitrogen atmosphere, followed by dissolution of the silica with 3M NaOH solution at about 95° C. Thermogravimetric analysis of the CIC samples up to 1000° C. in flowing air revealed less than 1% of residue, indicating that almost all silica was dissolved.

Ludox AS-30 (~230 m$^2$/g, ~13 nm) and AS-40 (~135 m$^2$/g, ~24 nm) colloidal silicas (from Aldrich) were used to prepare sample CIC-13, and samples CIC-24A and CIC-24B, respectively. The numbers 13 and 24 in the sample names refer to the mean pore diameter estimated from nitrogen adsorption data. In addition, two samples (CIC-24C and CIC-24D) were synthesized using the Ludox AS-40 colloidal silica and pretreated mesophase pitch particles. The mesophase pitch particles were pretreated by heating in silicone oil for 30 min at 250° C. and washing with toluene and acetone at room temperature.

Figure 2:
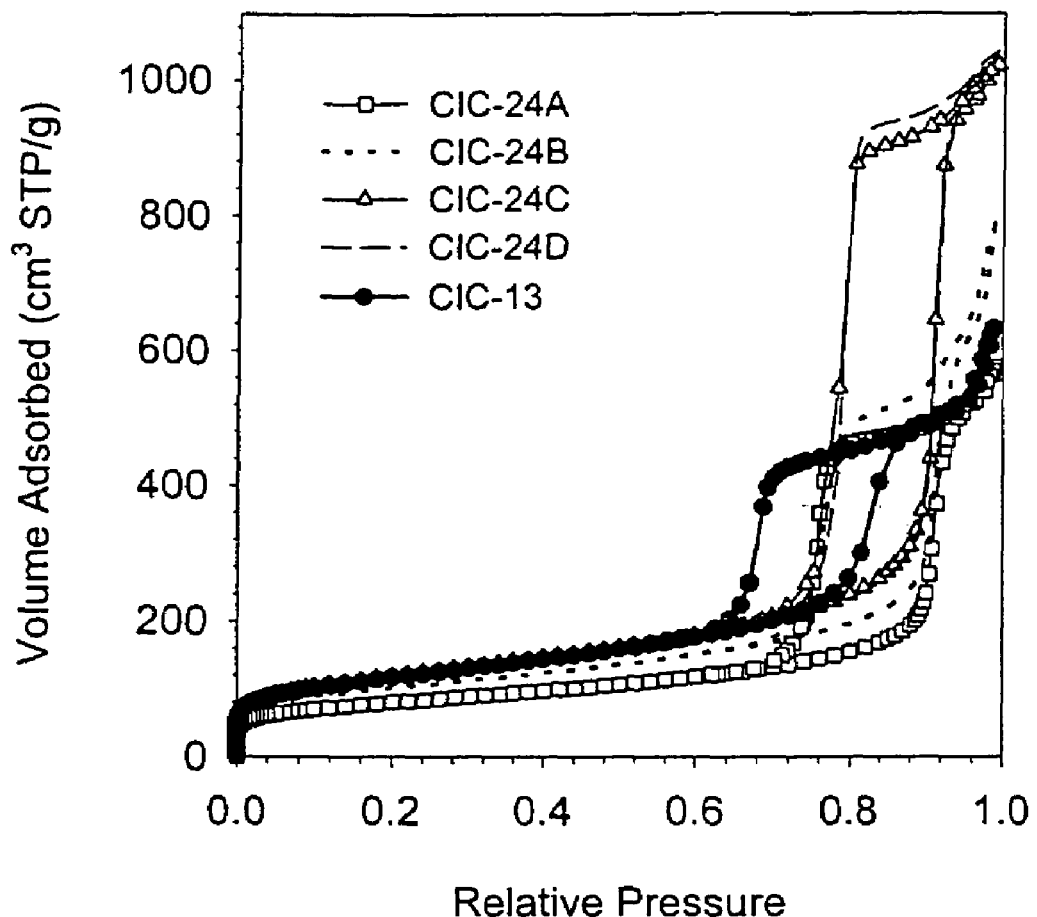
FIG. 2 is a graph showing the nitrogen adsorption-desorption isotherms of mesoporous carbon particles synthesized according to the method of the present invention.
Figure 3:
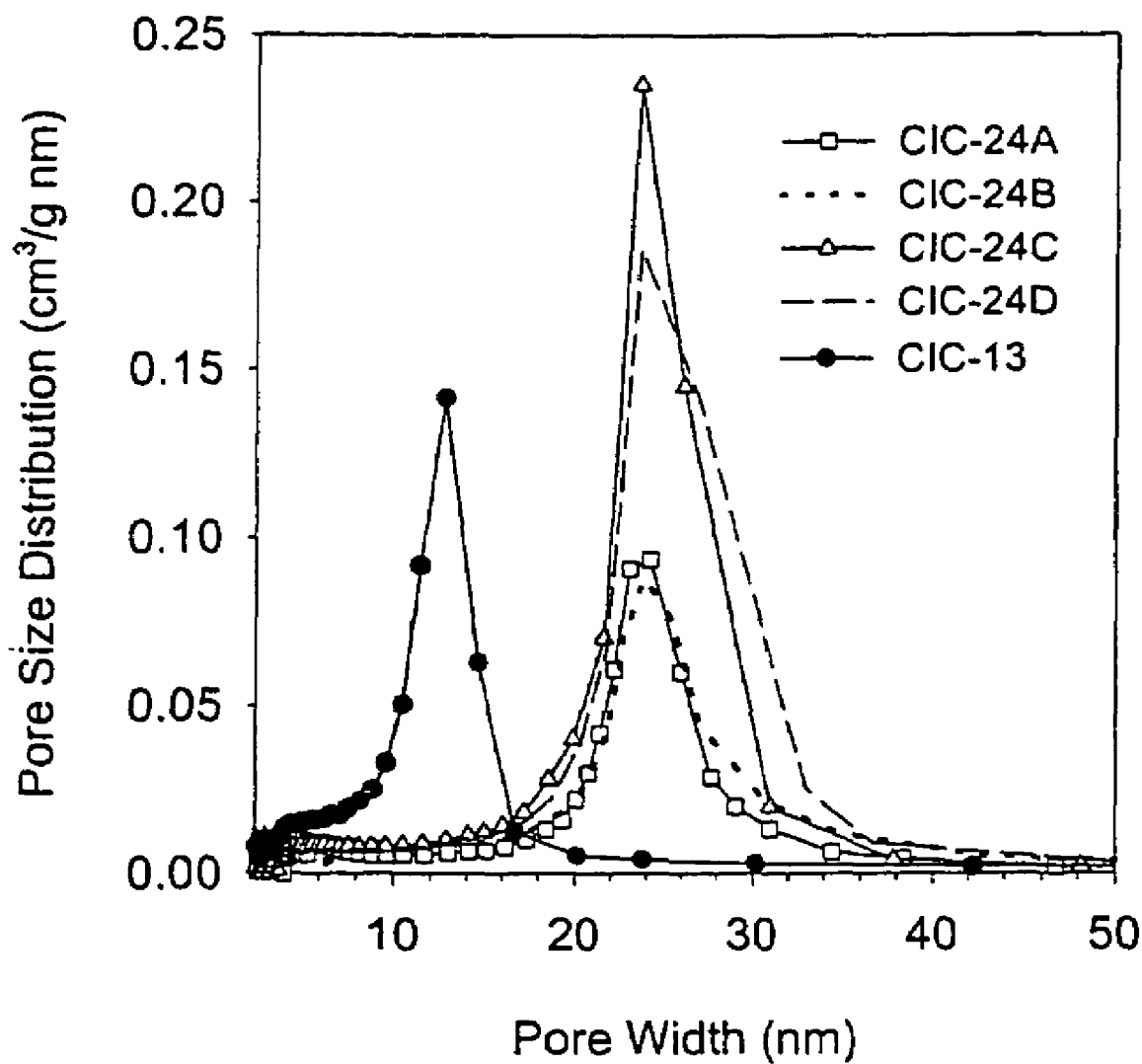
FIG. 3 is a graph showing the pore size distributions (PSD) of mesoporous carbon particles synthesized according to the method of the present invention.

Nitrogen adsorption-desorption isotherms at −196° C. for these samples, measured on a Micromeritics 2010 adsorption analyzer, are shown in FIG. 2. The corresponding pore size distributions (PSD) of the samples are shown in FIG. 3. The PSD were calculated by the method of Barrett, Joyner and Halenda (the BJH method) (J. Am. Chem. Soc. 1951, Vol. 73, p. 373) as modified recently by Kruk, Jaroniec and Sayari (Langmuir, 1997, Vol. 13, p. 6267). According to this method, the increments of the volume adsorbed at a given pressure can be related to the corresponding pore widths because of the theoretical or experimental relationships between the condensation pressure and pore width for a given adsorbate. As can be seen in FIG. 2, nitrogen adsorption isotherms exhibit very sharp condensation steps, which reflect narrow PSDs. FIG. 3 shows that the pore width at the maximum of PSD is within about ±10% of the particle size of the colloidal silica estimated on the basis of the manufacturer data, which may be due to the approximate nature of the BJH method. All four syntheses of the AS-40 imprinted carbons gave very similar values of the pore size, as shown in Table 1. Also, the synthesis method employing the pretreated pitch particles is highly reproducible as evidenced by the coincidence of adsorption isotherms for CIC-24C and CIC-24D. The total pore volumes and the specific surface areas for these samples are greater than those for CIC-24A and CIC-24B samples, but all of the samples had a total pore volume between about 0.9 cm$^3$/g and about 1.6 cm$^3$/g with average pore widths of approximately 24 nm.

TABLE 1

Properties of Colloid Imprinted Carbons (CIC)

| Sample | Surface Area (m$^2$/g) | Total Pore Volume (cm$^3$/g) | Pore Width (nm) |
|---|---|---|---|
| CIC-13 | 418 | 0.91 | 12.7 |
| CIC-24A | 286 | 0.89 | 24.2 |
| CIC-24B | 362 | 1.07 | 23.8 |
| CIC-24C | 425 | 1.57 | 23.6 |
| CIC-24D | 420 | 1.61 | 23.7 |

The CI process allows the control of the pore width of the resulting CIC materials over about 6 nm by using appropriate colloidal silica particles. In the case of silica colloids close to 6 nm, some pores larger than the single particles are often formed due to the presence of coalesced colloidal aggregates. However, even in this case, primary mesopores strictly corresponding to the single colloidal particles were formed, which has not been yet achieved by the colloidal crystal templating method. Also, the previous sol-gel-type process involving colloidal silica provided carbons with much broader PSD and without exact correspondence between the mean pore size and the diameter of the colloidal particles used. Carbons with much more narrow PSD centered at proper pore sizes have been synthesized using the same colloids as those used in previous methods. Another feature of this embodiment of CIC is the non-microporous nature of the carbons resulting from using the mesophase pitch as carbon precursor with no tendency to form micropores (microporosity was below 1-2% of the total pore volume).

Figure 4:
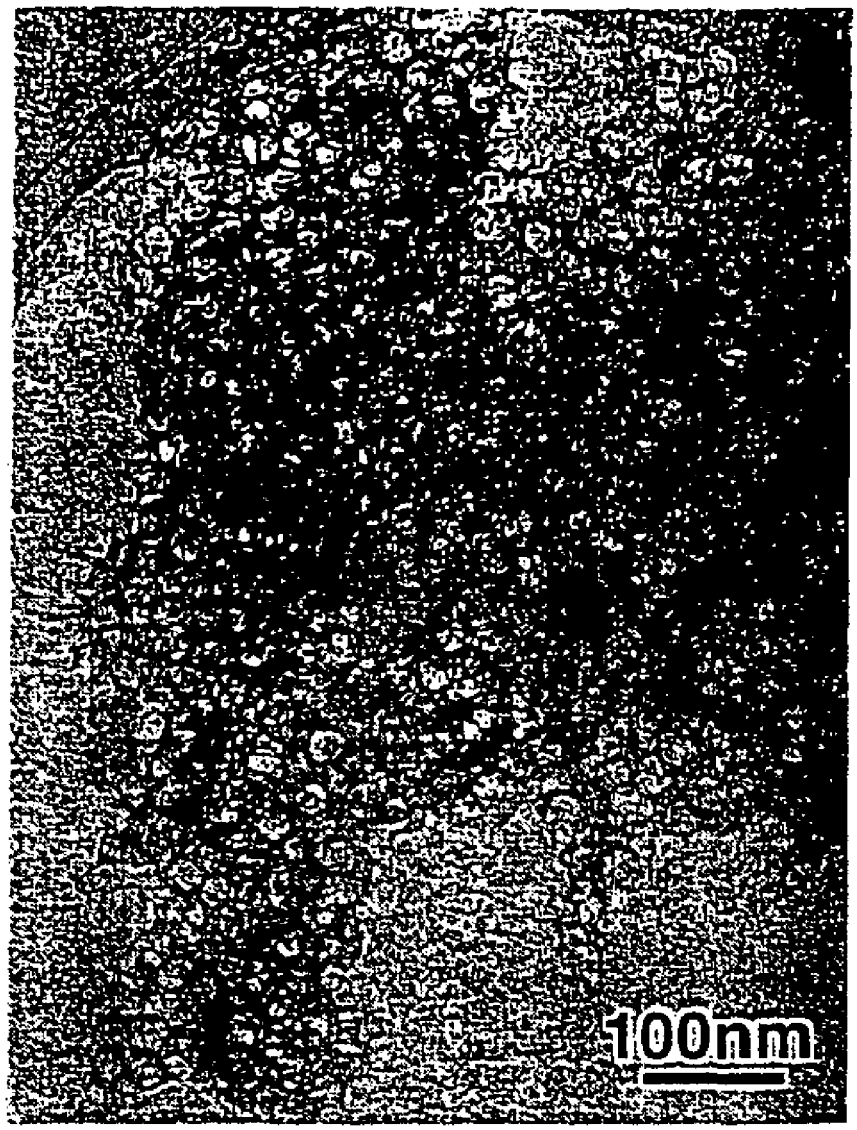
FIG. 4 is a transmission electron microscopy (TEM) image of mesoporous carbon particles (sample CIC-24A) recorded with a JEM-4000 EX TEM instrument.

As can be seen in FIG. 4, which shows a typical TEM image for CIC, the structure of this material consists of rather randomly distributed, interconnected spherical mesopores obtained by imprinting the pitch particles with colloidal silica particles. The size of these pores is remarkably uniform, which results from monodispersity of the colloidal silica particles.

As stated above, the method of the present invention may also be used to synthesize surface imprinted carbons. This requires the stabilization of colloidal silica-carbon precursor composites, which allows the amount of created mesopores in pitch particles, and consequently the mesopore volume and surface area of the resulting imprinted carbons, to be controlled. Carbons of relatively low pore volume and relatively low surface area are referred to as surface-imprinted carbons. To demonstrate the practice of this embodiment of the invention, samples CIC-A to CIC-L listed in Table 2 were synthesized using Ludox AS-40 (~135 m$^2$/g, ~24 nm diameter) colloidal silica from Aldrich. A synthetic mesophase pitch (Mitsubishi, AR-24) was used as a precursor for mesoporous carbons. The synthesis procedure includes grinding of the mesophase pitch, dispersion of colloidal silica particles, pore imprinting, stabilization, carbonization, removal of the colloidal silica, and graphitization, if desired. It is known that the mesophase pitch consists mainly of polyaromatics and possesses anisotropic properties. One gram of ground mesophase pitch (325 mesh, <45 μm diameter) was dispersed in 20 ml ethanol/water mixture (~60:40 volume ratio) by stirring for 60 minutes. Under vigorous stirring, 20 ml of colloidal silica were gradually added into the flask followed by further stirring for 5 hours. Then, the solvent was slowly evaporated. Pore imprinting was carried out in a tube furnace in nitrogen atmosphere at the temperature and for the time specified in Table 2. Next, the colloid-imprinted mesophase pitch was stabilized in air at 220° C. for 10 hours and carbonized under nitrogen protection at 900° C. for two hours with a heating rate of 5° C./min. Dissolution of colloidal silica particles was achieved using hot (90-95° C.) 3 M sodium hydroxide solution followed by treatment with hydrofluoric acid. The completeness of the silica removal was examined by thermogravimetry. It should be noted that the mesoporous carbons with low surface area and low mesopore volume (see the first sample in Table 2), especially surface-imprinted carbons, are synthesized by carrying out the imprinting process at temperature below the pitch softening point and do not require the heating above the pitch softening point (237° C. for the pitch used in this study). The samples from CIC-A to CIC-L listed in Table 2 were stabilized in air at 220° C. for 10 hours followed by carbonization at 900° C. for 2 hours under nitrogen protection. All these samples differ from those listed in Table 1, which were synthesized without the optional stabilization step. Sample CIC-13-24 was also prepared without the stabilization procedure as described above, but with a mixture of two colloidal silicas [AS-30 (~230 m$^2$/g, ~13 nm) and AS-40 (~135 m$^2$/g, ~24 nm) from Aldrich].

TABLE 2

Imprinting Temperature and Time, Specific Surface Area and Total Pore Volume of Colloid-Imprinted Carbons

| Carbon Sample | Imprinting Temperature (° C.) | Imprinting Time (min) | Specific Surface Area (m$^2$/g) | Total Pore Volume (cm$^3$/g) |
|---|---|---|---|---|
| CIC-A | 225 | 120 | 37 | 0.05 |
| CIC-B | 240 | 120 | 82 | 0.10 |
| CIC-C | 245 | 120 | 104 | 0.14 |
| CIC-D | 260 | 120 | 145 | 0.23 |
| CIC-E | 270 | 120 | 181 | 0.30 |
| CIC-F | 280 | 120 | 214 | 0.41 |
| CIC-G | 300 | 120 | 334 | 0.92 |
| CIC-H | 320 | 120 | 402 | 1.34 |
| CIC-I | 340 | 120 | 422 | 1.44 |
| CIC-J | 360 | 120 | 485 | 1.81 |
| CIC-K | 380 | 120 | 497 | 1.87 |
| CIC-L | 420 | 120 | 490 | 2.00 |
| CIC-13-24 | — | — | 426 | 1.08 |

Figure 5:
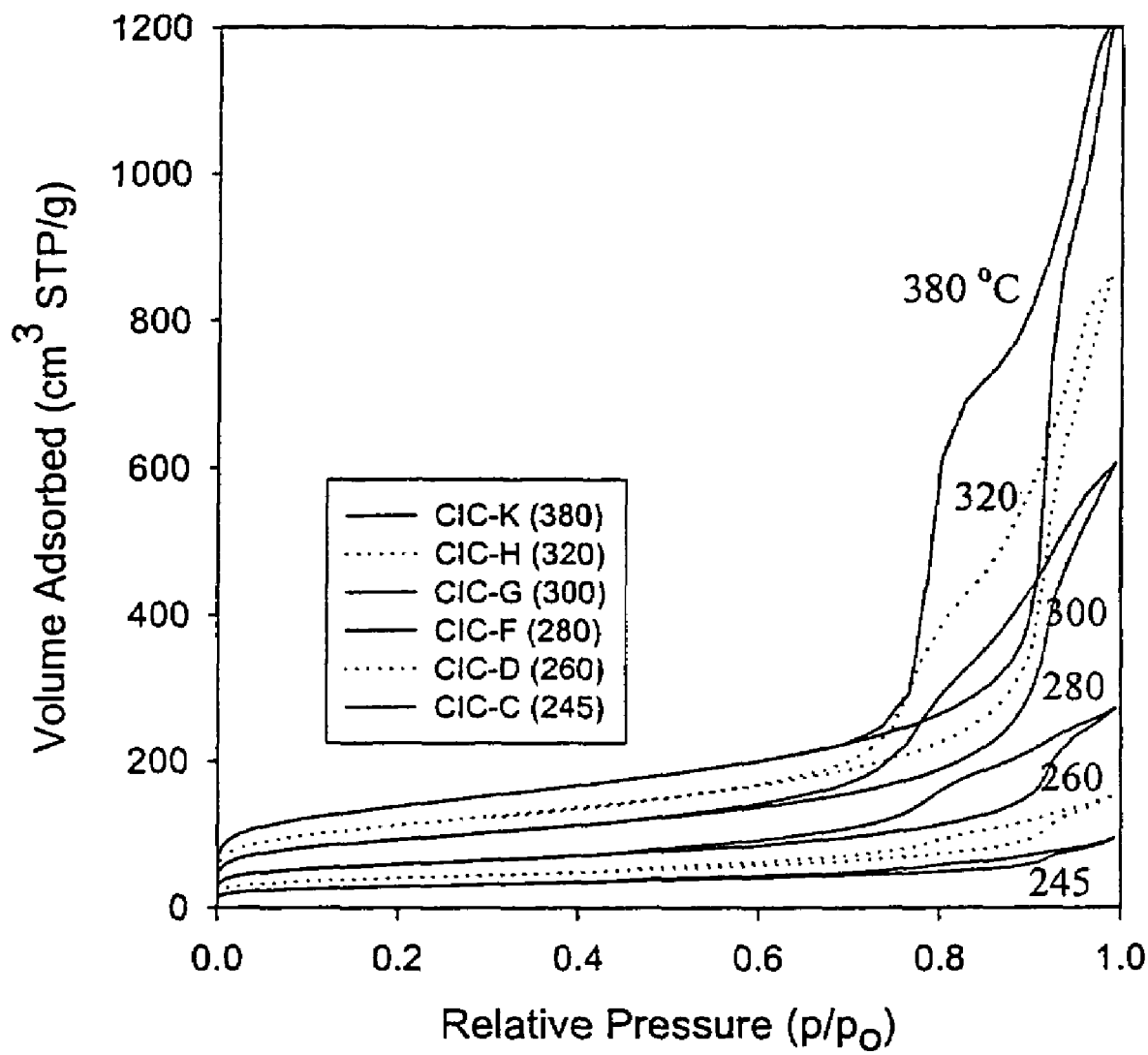
FIG. 5 is a graph showing the nitrogen adsorption-desorption isotherms of mesoporous carbon particles synthesized according to the method of the present invention with a stabilization step.

The nitrogen adsorption-desorption isotherms of representative samples of the carbons listed in Table 2 were measured as described above. These isotherms are shown in FIG. 5. Each sample was tested in duplicate. As shown in FIG. 5, the steepness of the condensation steps increase with the imprinting temperature. Similarly, the total pore volume increases with imprinting temperature, as shown in Table 2.

Figure 6:
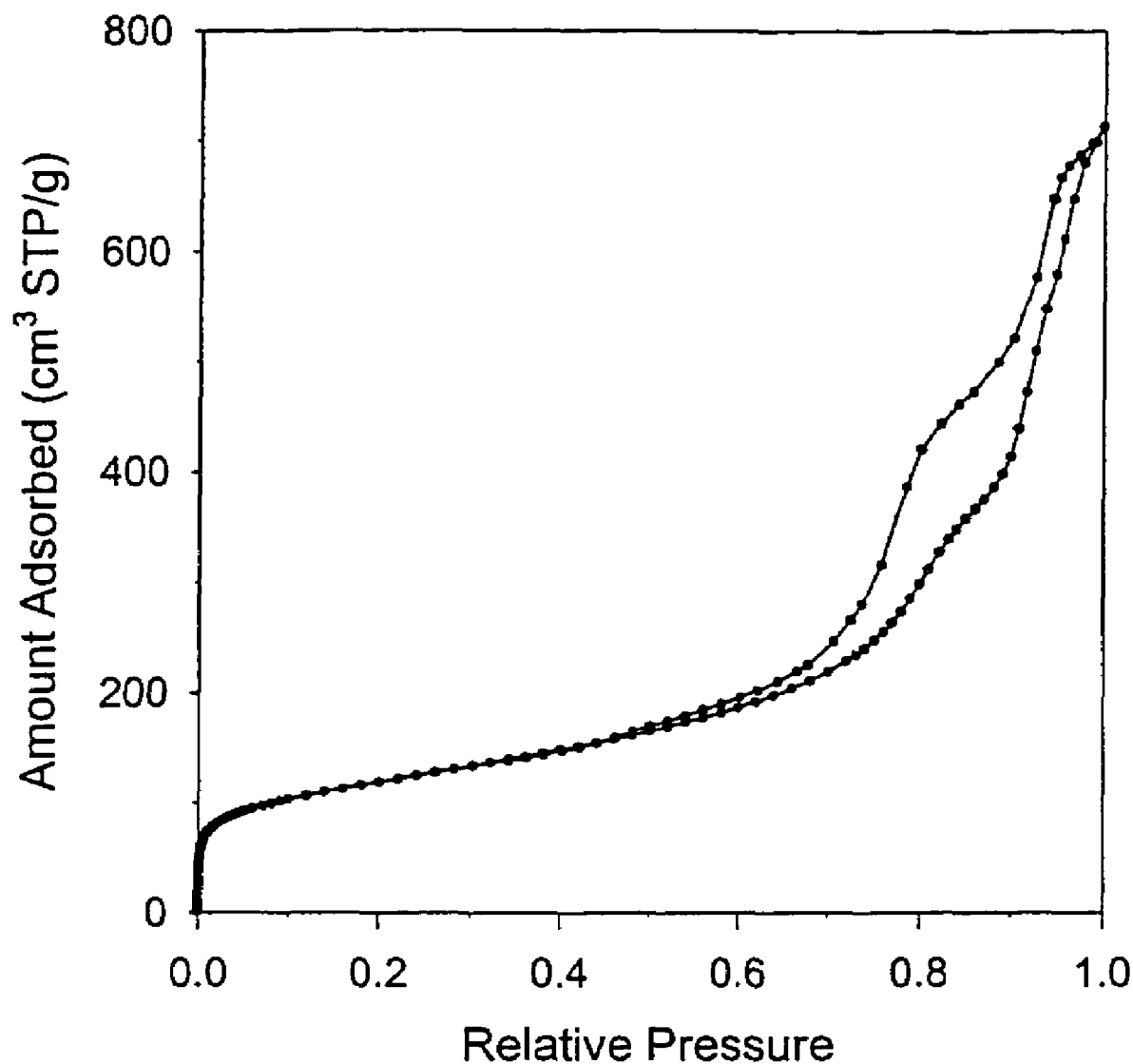
FIG. 6 is a graph showing the nitrogen adsorption-desorption isotherms of Sample CIC 13-24.
Figure 7:
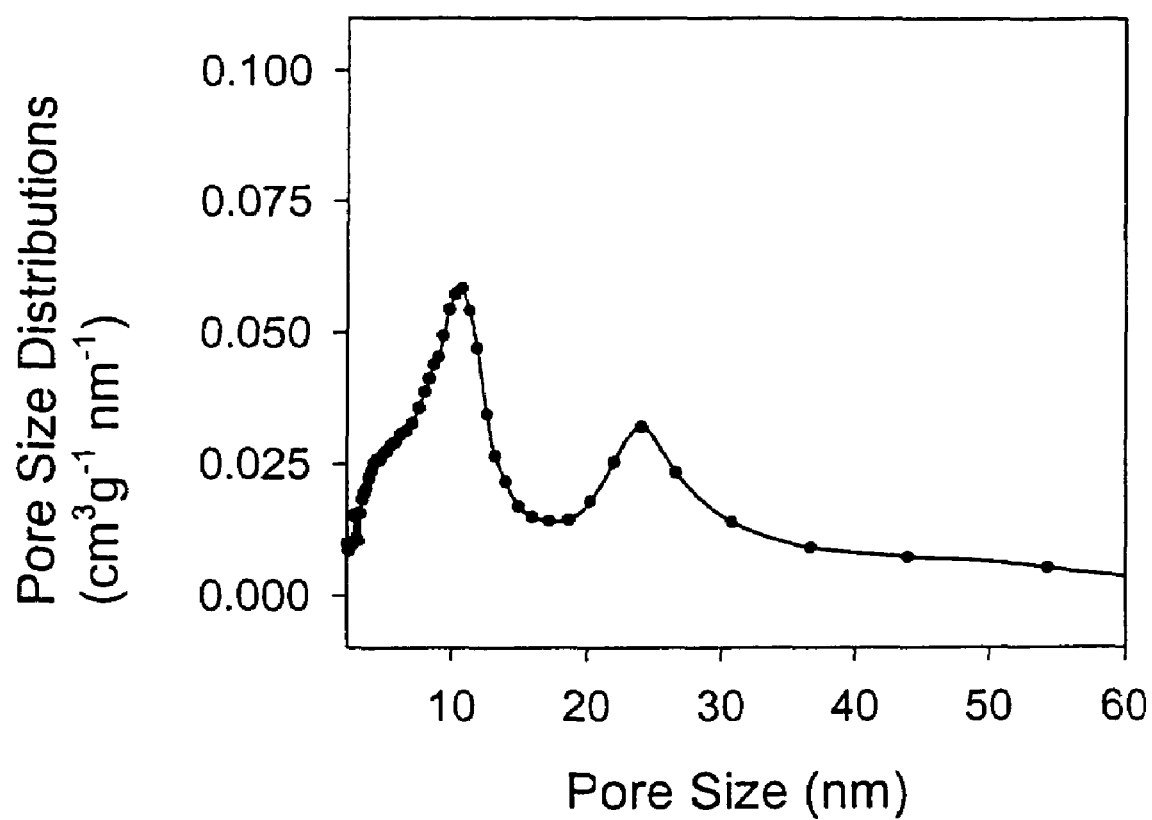
FIG. 7 is a graph showing the pore size distributions (PSD) of CIC 13-24.

Nitrogen adsorption isotherms and pore size distributions for the CIC-13-24 sample are shown in FIGS. 6 and 7, respectively. As can be seen, the use of silica colloids of different particle size (~13 nm and 24 nm) affords a carbon with a bimodal pore size distribution.

The colloid imprinted carbons of the present invention may also be further processed to create graphitized carbons with uniform mesopores. The structure of some previous carbons collapses on graphitization. However, the structure of the mesoporous carbons of the present invention does not collapse, but is maintained. The surface area and pore size may be reduced on graphitization however. Although not wishing to condition patentability on any particular theory of operation, it is believed that graphitization will cause the closure of micropores, making graphitized mesoporous carbons particularly suitable for use as chromatographic separation media and as electrode materials in electrochemical applications. A graphitized carbon was synthesized as follows.

A synthetic mesophase pitch AR (softening point 237° C.) from Mitsubishi and Ludox AS-40 colloidal silica (~135 m$^2$/g, ~24 nm diameter) from Aldrich were used in the synthesis. The pitch precursor was ground (particle size <45 μm), pretreated in silicone oil for 30 min at 250° C. and then washed with toluene and acetone. Next, the mesophase pitch particles were dispersed in ethanol and the resulting mixture was added gradually to a colloidal silica (AS-40) suspension under vigorous stirring. The stirring was continued for five hours and the solvent was slowly evaporated. The pore imprinting procedure was carried out at 260° C. in nitrogen atmosphere for 30 minutes, followed by heating at a rate of 2° C./min to 600° C. and 5° C./min to 900° C., and an isothermal treatment at 900° C. for 120 minutes in nitrogen. The carbonized sample was treated with 3M hot sodium hydroxide solution (95° C.) until silica particles were totally dissolved, which was checked by thermogravimetric analysis of the sample in air up to 1000° C. The resulting carbon material is listed in Table 1 as sample CIC-24C. This sample was subjected to the high temperature treatment in an inert atmosphere, i.e., a graphitization process. The graphitization was carried out under the protection of argon using a heating rate of 10° C./min until a temperature of 2400° C. was reached, and it was continued for 60 min at 2400° C. followed by cooling the sample to room temperature under argon atmosphere. The resulting graphitized carbon is denoted as sample CIC-24C-G.

Figure 8:
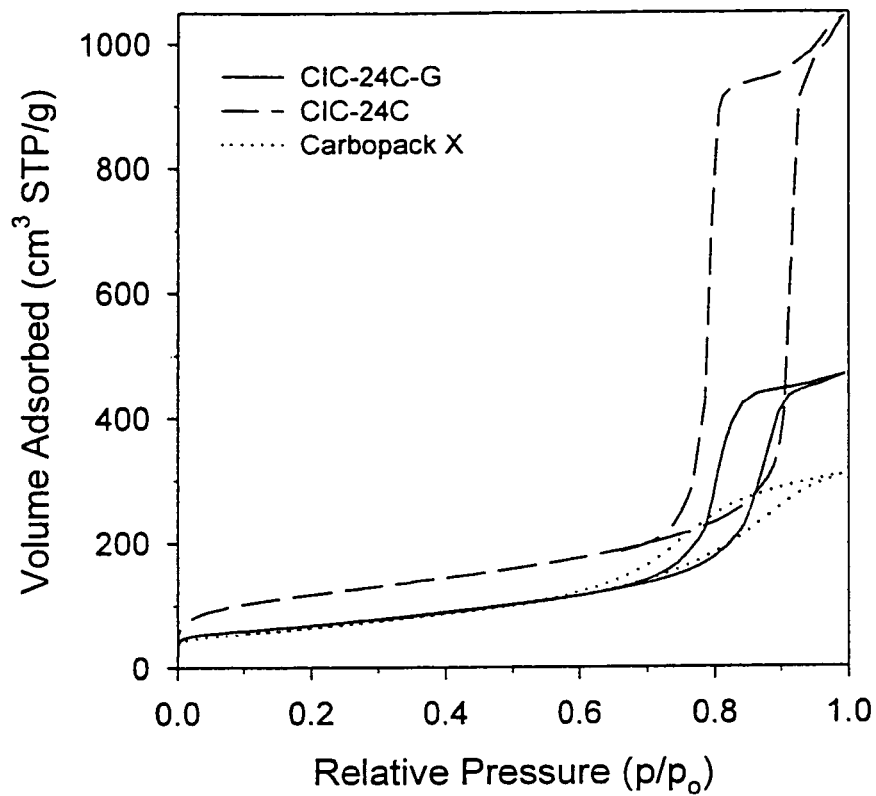
FIG. 8 is a graph showing the nitrogen adsorption-desorption isotherms of graphitized and ungraphitized mesoporous carbon particles synthesized according to the method of the present invention compared to a commercially available carbon.
Figure 9:
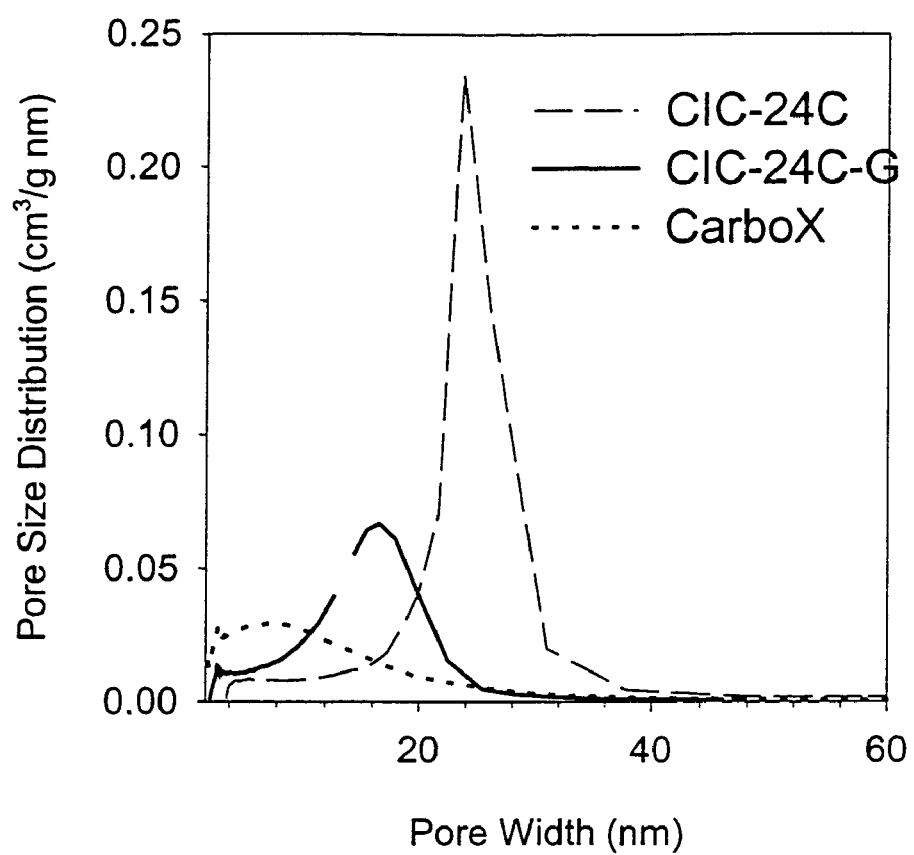
FIG. 9 is a graph showing the pore size distributions (PSD) of graphitized and ungraphitized mesoporous carbon particles synthesized according to the method of the present invention compared to a commercially available carbon.

Pore size distributions (PSD's) for ungraphitized (CIC-24C) and graphitized (CIC-24C-G) carbon samples were also determined as described above. The nitrogen adsorption isotherms of these samples are shown in FIG. 8 in comparison to that of a commercially available mesoporous carbon, CARBOPACK X (Supelco, Inc.). The corresponding PSD's are shown in FIG. 9. As can be seen in FIG. 9, both of the CIC samples exhibit much narrower distribution of pore sizes than the commercially available carbon. The PSD dispersion of the CIC samples is about twice as narrow as that corresponding to the commercial sample.

Finally, we demonstrate that the imprinting method is not limited to the use of colloidal silicas but includes the use of non-colloidal silica particles. The example below shows that the pitch particles can be imprinted with porous particles, preferably porous inorganic particles such as porous silica, which are much greater in size than colloidal silica particles. The imprinting process was analogous to that used for the synthesis of surface-imprinted carbons. The synthetic mesophase pitch AR (softening point 237° C.) from Mitsubishi was used as carbon precursor. Two particle-imprinted carbons were synthesized by using different porous silica particles. The first carbon was synthesized by employing a silica gel from Aldrich produced for thin layer chromatography, which has a specific surface area of about 500 m$^2$/g, an average pore size of about 6 nm, and an average particle size of about 25 microns. The imprinting process was carried out at 220° C. followed by stabilization in air at 220° C. for 10 hours. The resulting particle-imprinted carbon (PIC) is denoted as PIC-A. Another PIC carbon was synthesized by using the same carbon precursor and a LiChrospher Si100 silica from Merck produced for liquid chromatography separations. This silica has a specific surface area of about 340 $m^2/g$, an average pore size of about 10 nm, and an average particle size of about 10 micrometers. The imprinting process was carried out at 220° C. followed by the stabilization in air at 228° C. for 10 hours. The resulting particle-imprinted carbon is denoted as PIC-M.

Figure 10A:
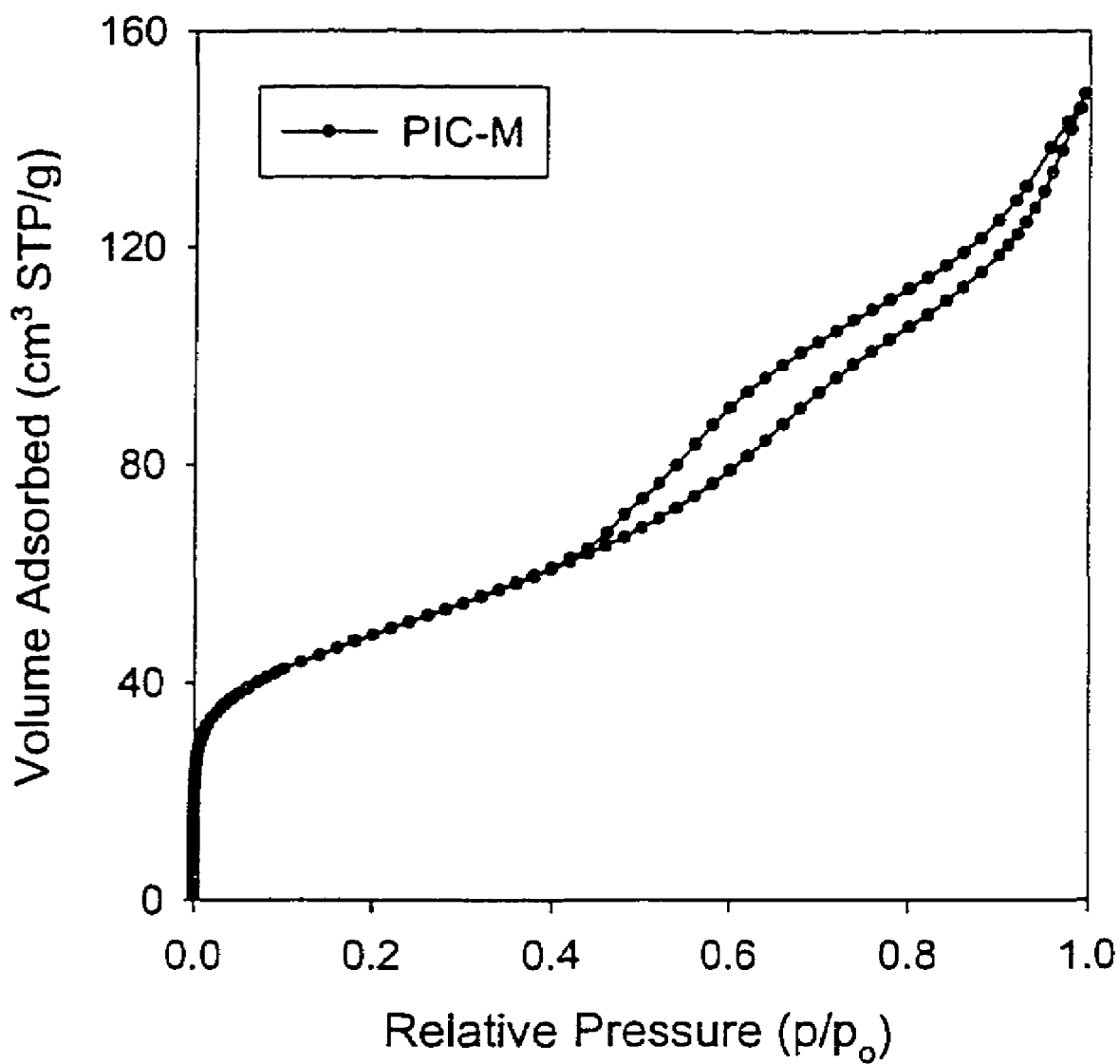
FIG. 10A is a graph showing the nitrogen adsorption-desorption isotherm of Sample PIC-M.
Figure 10B:
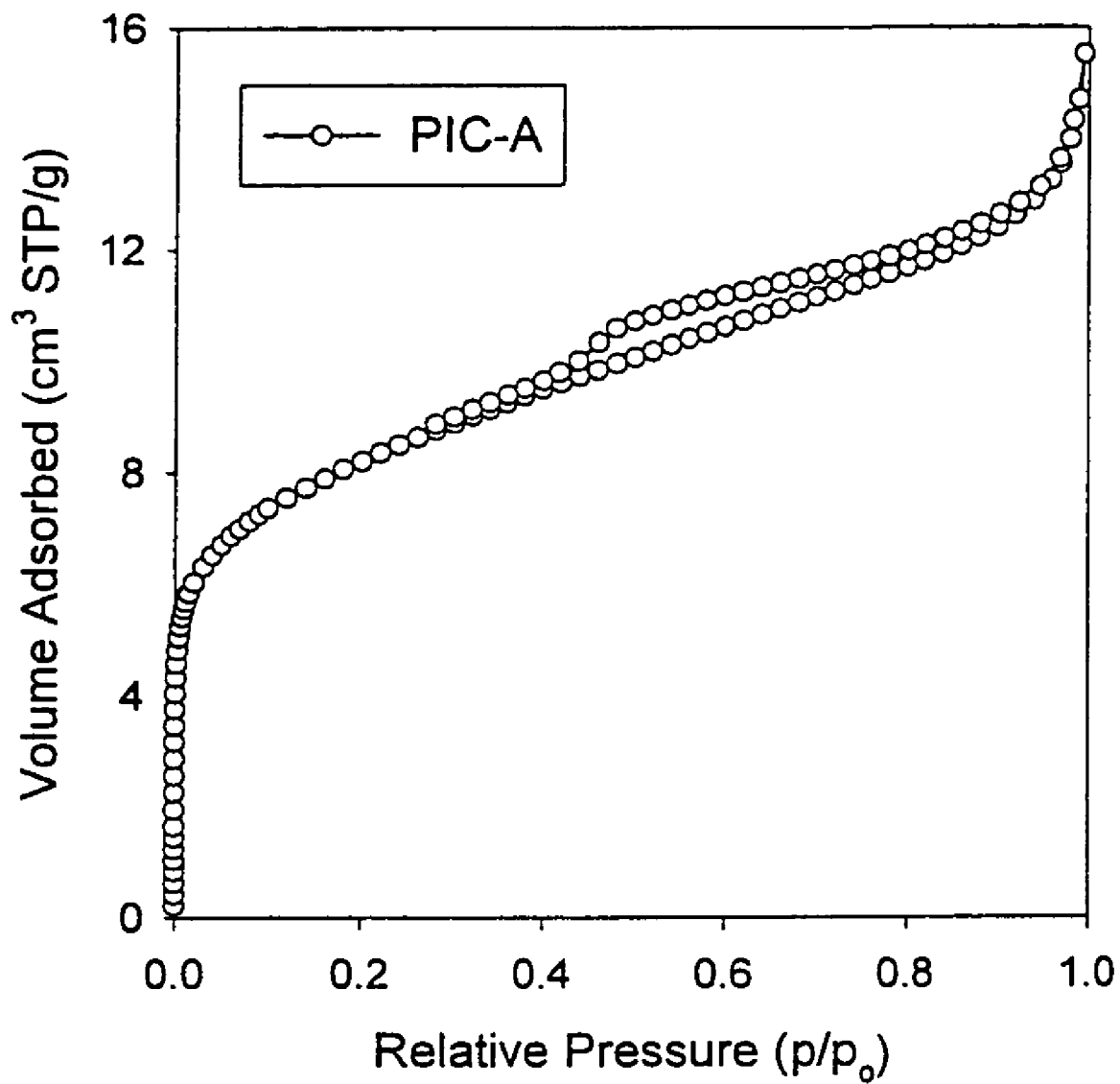
FIG. 10B is a graph showing the nitrogen adsorption-desorption isotherm of Sample PIC-A.

Nitrogen adsorption isotherms for both particle-imprinted carbons (PIC-A and PIC-M) were also determined as described above. These isotherms, shown in FIGS. 10A and 10B, exhibit either broader condensation steps (FIG. 10A-PIC-M) than that observed for CIC-carbons or a gradual increase in the amount adsorbed (FIG. 10B-PIC-A). Although the pore size distributions for those carbons are broad, their pore volume and surface area can be tailored, making them attractive for chromatographic separations and other above mentioned applications. The use of porous imprinting particles allows the pore wall structure to be imprinted in addition to imprinting the particle shape and size in the pitch particles. For the PIC samples studied, the contribution to the surface area arising from imprinting the shape and size of silica particles is negligible because the size of the silica particles used was relatively high (10 and 25 micrometers). The resulting surface area in those carbons arises from imprinting the pore wall structure of the silica particles used. Thus, the porous structure of particle-imprinted carbons represents an inverse replica of the porous structure of the silica particles. The use of silica particles with ordered porous structure in the imprinting process would improve the pore size distribution of the PIC samples. The ability to imprint the pore wall structure of particles in pitch particles distinguishes particle-imprinted carbons from colloid-imprinted carbons, in which only the shape and size of colloidal particles could be imprinted.

Based upon the foregoing disclosure, it should now be apparent that the imprinting of the mesophase pitch or other precarbon particles with imprinting material such as colloidal silica particles provides a simple way to synthesize carbons with interconnected mesopores having diameters that correspond to the size of the imprinting material used. The process of the present invention is reproducible and effective for the synthesis of carbons with desired sizes of mesopores, tailored pore volume and tailored surface area. Both pitch and colloidal silica, are commercially available on a large scale. It is expected that this process is also suitable for tailoring adsorption and catalytic properties by adding colloidal particles of specific surface properties. In addition, the CIC materials, similarly to carbon fibers, can be oxidized under controlled conditions to create micropores and alter their surface properties as well as graphitized to introduce the graphite crystalinity. These modification opportunities extend their potential applications ranging from adsorption to catalysts supports and electrode materials. In addition, the process of imprinting carbon precursor particles can involve any porous particles such as porous silica particles and allows one to imprint not only the shape and size of particles (as in the case of colloidal imprinting) but also the pore wall structure of the particles used.

It is to be understood that any variations evident fall within the scope of the claimed invention and thus, the selection of specific component elements can be determined without departing from the spirit of the invention herein disclosed and described.

We claimed:

1. A method of synthesizing mesoporous carbon particles consisting essentially of the steps of: providing solid particles of at least one carbon precursor having a softening point of from about 200° C. to about 400° C.; mixing the solid particles of the at least one solid carbon precursor with a medium containing solid imprinting particles to form pretreated solid carbon precursor particles; diffusing the solid imprinting particles into the solid carbon precursor particles by heating the pretreated solid carbon precursor particles in an inert atmosphere at a temperature from about 20° C. below to about 200° C. above the softening point of the solid carbon precursor and forming solid carbon precursor particles having said imprinting particles therein; subsequently carbonizing the solid carbon precursor particles containing imprinting particles therein at a temperature above the diffusing temperature to form carbon hybrid particles; and then removing the solid imprinting material from the carbon hybrid particles to form the mesoporous carbon particles.

2. The method according to claim 1, wherein the solid carbon precursor particles are selected from mesophase pitch, carbon-containing synthetic pitch, isotropic petroleum pitch, coal tar based pitch, polystyrene, polyacrylonitrile, or phenolic resin.

3. The method according to claim 1, wherein the imprinting particles are spherical silica particles measuring between about 5 nanometers and about 1 micrometer in at least one dimension.

4. The method according to claim 2, wherein the imprinting particles are silica particles measuring between about 1 micrometer and about 50 micrometers in at least one dimension.

5. The method according to claim 2, wherein said imprinting particles are silica particles having a diameter of from about 5 to about 100 nanometers; and wherein the step of diffusing the solid silica particles into the pretreated solid carbon precursor particles occurs at a temperature of from about 10° C. below to about 200° C. above the softening point of the carbon precursor in a non-oxidizing atmosphere.

6. The method according to claim 5, wherein the step of removing the silica imprinting material from the carbon hybrid particles utilizes a basic solution at a temperature above room temperature, or treating the carbon hybrid particles with an acid.

7. A method of synthesizing mesonorous carbon particles comprising the steps of: providing solid particles of at least one carbon precursor having a softening point of from about 200° C. to about 400° C.; mixing the solid particles of the at least one solid carbon precursor with a medium containing solid imprinting particles to form pretreated solid carbon precursor particles, said imprinting particles additionally comprises metal or metal oxide colloidal particles; diffusing the solid imprinting particles into the solid carbon precursor particles by heating the pretreated solid carbon precursor particles in an inert atmosphere at a temperature from about 20° C. below to about 200° C. above the softening point of the solid carbon precursor and forming solid carbon precursor particles having said imprinting particles therein; subsequently carbonizing the solid carbon precursor particles containing imprinting particles therein at a temperature above the diffusing temperature to form carbon hybrid particles: and then removing the solid imprinting material from the carbon hybrid particles to form the mesoporous carbon particles.

* * * * *